United States Patent
Narula et al.

(10) Patent No.: US 12,556,470 B2
(45) Date of Patent: Feb. 17, 2026

(54) MULTI-LINK OPERATION FOR DELAY-SENSITIVE TRAFFIC

(71) Applicant: Dell Products L.P., Round Rock, TX (US)

(72) Inventors: Harpreet Narula, Austin, TX (US); Tyler Cox, Austin, TX (US); Marc Hammons, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 335 days.

(21) Appl. No.: 17/654,489

(22) Filed: Mar. 11, 2022

(65) Prior Publication Data

US 2023/0291671 A1   Sep. 14, 2023

(51) Int. Cl.

| | |
|---|---|
| H04L 43/087 | (2022.01) |
| H04L 41/142 | (2022.01) |
| H04L 43/02 | (2022.01) |
| H04L 43/04 | (2022.01) |
| H04L 43/0852 | (2022.01) |
| H04W 24/08 | (2009.01) |
| H04W 24/10 | (2009.01) |
| H04W 28/24 | (2009.01) |
| H04W 72/0453 | (2023.01) |
| H04W 72/54 | (2023.01) |
| H04W 76/15 | (2018.01) |

(52) U.S. Cl.
CPC ............ *H04L 43/087* (2013.01); *H04L 43/02* (2013.01); *H04L 43/04* (2013.01); *H04W 24/08* (2013.01); *H04W 24/10* (2013.01); *H04W 72/0453* (2013.01); *H04W 72/54* (2023.01); *H04L 41/142* (2013.01); *H04L 43/0852* (2013.01); *H04W 28/24* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 11,159,423 B2 * | 10/2021 | Amend | H04L 69/14 |
| 11,824,961 B1 * | 11/2023 | Wei | H04L 69/161 |
| 2018/0077068 A1 * | 3/2018 | Dhanabalan | H04L 69/04 |
| 2019/0007286 A1 * | 1/2019 | Klemetsson | H04L 41/147 |

(Continued)

FOREIGN PATENT DOCUMENTS

WO   WO-2018211488 A1 *   11/2018   ........ B60W 60/0011

*Primary Examiner* — Jay L Vogel
(74) *Attorney, Agent, or Firm* — Norton Rose Fulbright US LLP

(57) ABSTRACT

This disclosure provides systems, methods, and devices for network management. In a first aspect, a method of managing communications links includes determining a latency sensitivity for first data for transmission between a first device and a second device and determining whether the latency sensitivity satisfies a criteria. When the criteria is met, the method includes determining a plurality of jitter likelihood values corresponding to a plurality of links between the first device and the second device; and configuring multi-link operation between the first device and the second device using a first link of the plurality of links and a second link of the plurality of links, wherein the first link and the second link are determined based on the plurality of jitter likelihood values. Other aspects and features are also claimed and described.

19 Claims, 11 Drawing Sheets

(56) References Cited

U.S. PATENT DOCUMENTS

| | | | |
|---|---|---|---|
| 2019/0014024 A1* | 1/2019 | Koshy | H04L 45/245 |
| 2021/0092657 A1* | 3/2021 | Kanagarathinam | H04W 36/0079 |
| 2021/0114616 A1* | 4/2021 | Altman | H04W 76/15 |
| 2021/0400537 A1* | 12/2021 | Zhang | H04L 47/28 |
| 2022/0322219 A1* | 10/2022 | Gandhi | H04W 76/15 |
| 2022/0337338 A1* | 10/2022 | Homchaudhuri | H04W 52/0254 |
| 2024/0049056 A1* | 2/2024 | Shu | H04W 28/0215 |

* cited by examiner

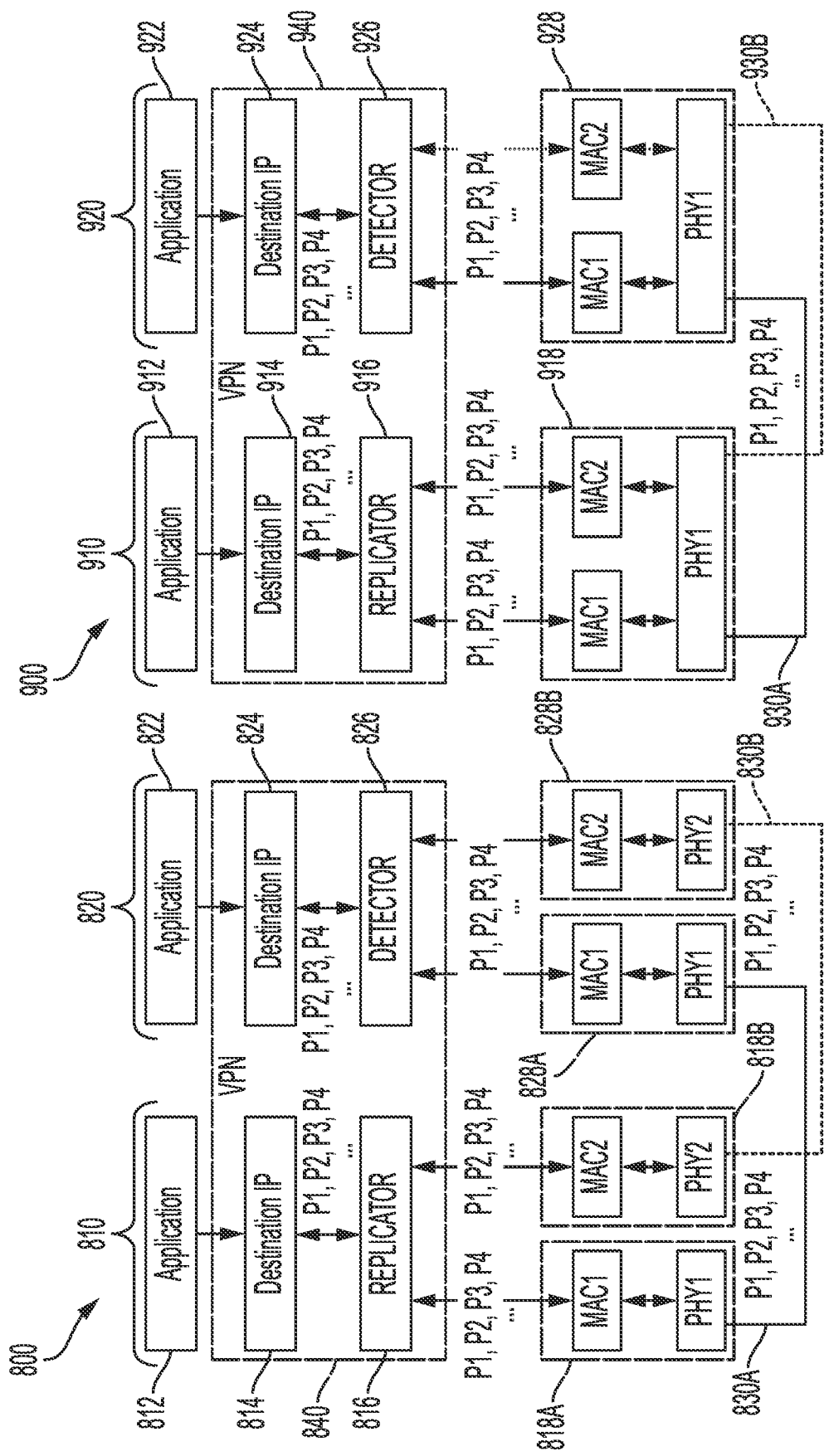

MULTI-LINK OPERATION FOR DELAY-SENSITIVE TRAFFIC

FIELD OF THE DISCLOSURE

The instant disclosure relates to information handling systems. More specifically, portions of this disclosure relate to managing communications links for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Wireless communications with information handling systems is desirable because of the benefit of not dealing with wires. However, wireless communications has limits, in part, due to the noisy environment of shared wireless spectrum, as opposed to the dedicated point-to-point connection of a wire. Additionally, propagation of radio frequency (RF) signals through air is less predicable than propagation of signals through a conductor, such as copper wire, or an optical medium, such as in fiber optics.

SUMMARY

Wireless connections may be improved through operations on communications links to reduce latency and/or to reduce latency jitter. Latency may refer to the delay between transmission of information from one device and the reception of the information by another device. Jitter may refer to variation, such that latency jitter may refer to variation in latency of a communications link. Latency causes delay in the reception of information from the source. However, latency can sometimes be compensated for when the latency is known. Latency jitter, or variation in latency, is difficult to compensate for because the unpredictable nature of the variation. Embodiments of this disclosure provide for operations on communications links, such as multi-link operation, that reduce latency and/or reduce latency jitter of the communication links. This may improve user experience and allow communications, including wireless communications, in noisy environments where low-latency applications could otherwise not provide a satisfactory user experience.

One example of low-latency applications benefiting from reduced latency and/or latency jitter is gaming applications. In some embodiments, game streaming is performed by decoupling of the game rendering workload from the display endpoint by broadcasting the rendered graphics as a networked media stream. Because gaming scenarios often are responsive to one or more user input feeds that interact with the gaming world and state, and gamer experience and performance may be negatively impacted by underperforming network connections. One measure of game stream quality is jitter, which is the variability of the end-to-end network latency. A stable, optimized stream will seek to minimize jitter for a consistent gaming experience. Home game streaming solutions are particularly sensitive to jitter, as in many deployments both the game host rendering the game and the game client terminating the stream on the display will have wireless communication links. Wireless communication links in a shared medium have variable latency depending on the load conditions and collisions due to environmental RF noise.

According to some embodiments herein, dual-band simultaneous radios transmit the same packets over different frequency channels, which reduces the latency. Using multiple communications links involves replicating (e.g., duplicating) packets and managing the communication links during application execution with minimal delays in the processing (e.g., packaging, transmitting, and receiving) of the packets. This may be accomplished through the use of a replicator and/or detector executing on the device. The replicator and/or detector may operate at a lower level than the application level, which allows the replicator and/or detector to be application-agnostic in managing the flow of traffic on communications links.

According to one embodiment, a method includes determining a latency sensitivity for first data for transmission between a first device and a second device; determining whether the latency sensitivity satisfies a criteria; and when the criteria is determined to be satisfied: determining a plurality of jitter likelihood values corresponding to a plurality of links between the first device and the second device; and configuring multi-link operation between the first device and the second device using a first link of the plurality of links and a second link of the plurality of links, wherein the first link and the second link are determined based on the plurality of jitter likelihood values. In certain embodiments, the method may include operations described with reference to FIGS. 2-9. In certain embodiments, the method may be performed in environments described with reference to FIG. 1 and FIGS. 11-13.

The method may be embedded in a computer-readable medium as computer program code comprising instructions that cause a processor to perform operations corresponding to the steps of the method. In some embodiments, the processor may be part of an information handling system including a first network adaptor, including a first physical radio, configured to transmit data over a first network connection; a second network adaptor, including a second physical radio, configured to transmit data over a second network connection; and a processor coupled to the first network adaptor and the second network adaptor, and the memory. The memory may include computer program code comprising instructions that cause a processor to perform operations corresponding to the steps of the method.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 8 is a block diagram illustrating a dual-physical radio for multi-link operation according to some embodiments of the disclosure.

FIG. 9 is a block diagram illustrating a single-physical radio for multi-link operation according to some embodiments of the disclosure.

DETAILED DESCRIPTION

These example embodiments describe and illustrate various techniques for managing communication links of an information handling system. Some embodiments involve determining latency and/or latency jitter sensitivity of data processed on an information handling system and managing communications links in accordance with characteristics of the data (e.g., whether data is delay-sensitive data or normal data).

Figure 1:
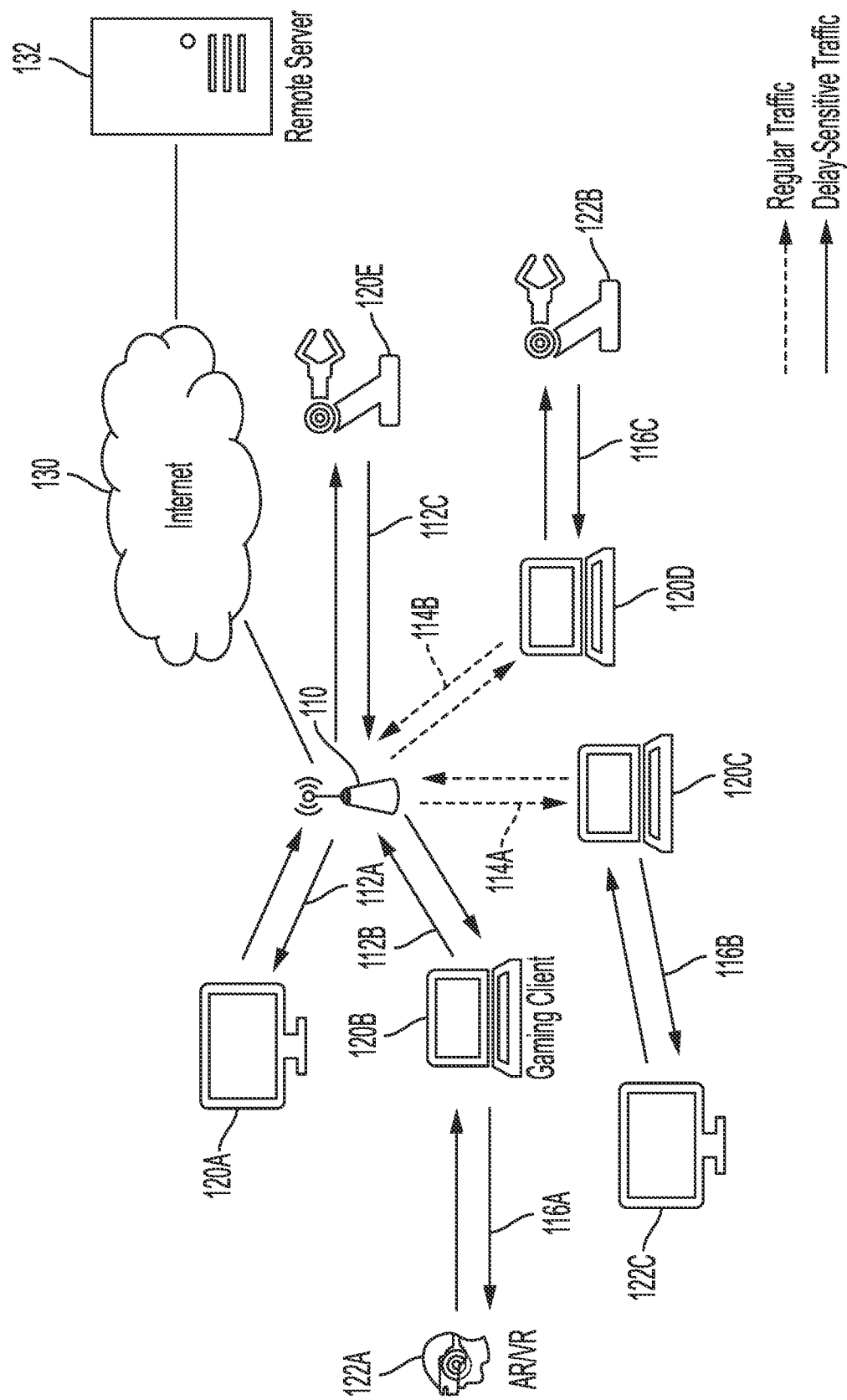
FIG. 1 is an illustration of a network environment with delay-sensitive traffic according to some embodiments of the disclosure.

FIG. 1 is an illustration of a network environment with delay-sensitive traffic according to some embodiments of the disclosure. An access point 110 may be coupled to devices 120A-E through communications links, including wireless, wired, or a combination of wireless and wired links. In some embodiments, the access point 110 may support multiple access technologies, such as multiple wireless communications standards (e.g., 802.11 WiFi, Bluetooth, cellular, etc.) and/or multiple channels (e.g., 2.4 GHz, 5 GHz, 6 GHz, mmWave, etc.). Devices 120A-E may include displays and/or information handling systems (e.g., gaming clients, augmented reality/virtual reality (AR/VR) equipment, laptop computers, desktop computers, manufacturing tools, etc.). Each of the devices 120A-E may have a separate communication link 112A, 112B, 114A, 114B, 112C to the access point 110, respectively. The communication links 112A-C and 114A-B may have a shared medium, such as a shared wireless spectrum, for communicating with the access point 110.

Data transmitted over the communication links 112A-C and 114A-B may have different characteristics, which may be specific to the devices 120A-E and/or application executing on the devices 120A-E. In some embodiments, communication links 112A-C may communicate delay-sensitive traffic. For example, device 120A is a display, which may be displaying information in real-time at 30, 60, or 120 frames per second (fps), and any delay in the transmission of data along communication link 112A to device 120A results in choppy playback that reduces the user experience. Other communication links 114A-B may carry normal network traffic that does not have particular sensitivity to delays, such as data for web pages or asynchronous information transfer.

In some embodiments, other devices 122A-B may be communicating with one or more of the devices 120A-E, in which some traffic is transmitted through devices 120A-E to the access point 110. For example, AR/VR equipment 122A may communicate with gaming client 120B through communication link 116A. As another example, display 122C may communicate with personal computer 120C through communication link 116B. As a further example, manufacturing tool 122B may communicate with personal computer 120D through communication link 116C. The communication links 116A-C may transmit normal traffic or delay-sensitive traffic. In some embodiments, the communications links 116A-C may share a medium with the communication links 112A-C and 114A-B.

The access point 110 may provide network services and/or network connectivity to the devices 120A-E and/or devices 122A-B. For example, the access point 110 may be coupled to one or more additional networks, such as the Internet 130, and provide routing capabilities to allow access to remote server 132.

The access point 110 and devices 120A-E may cooperate to provide communication links with characteristics that match the traffic transmitted through the communication links. For example, additional operations may be performed on communication links that transmit delay-sensitive data. The operations may include evaluating available communication channels to determine a desired communication channel, such as described in the embodiments of FIG. 2 or FIG. 3, and/or providing redundant communications, such as described in the embodiments of FIG. 4, FIG. 5, FIG. 6, FIG. 7, FIG. 8, and FIG. 9. In some embodiments, these additional operations may be particularly advantageous when multiple communication links are sharing the same medium, which introduces delays in the communication links. For example, when multiple wireless devices are communicating in the same area on the same channel(s), one device's transmissions may interfere with another device's transmission or reception.

Managing the communication links may be important in these noisy environments to maintain characteristics of the communication links that allow maintaining transmission of delay-sensitive data. For example, the communication links may be managed by the access point 110 to maintain a quality of service (QoS) with low delay on communication link 112A to display 120A through one or more of the techniques described with respect to FIG. 2, FIG. 3, FIG. 4, FIG. 5, FIG. 6, FIG. 7, FIG. 8, and FIG. 9. These techniques may be useful in many environments for allowing the transmission of delay-sensitive traffic. One example environment for implementing these techniques is a home having multiple information handling systems that may be executing multiple gaming sessions, as described in the embodiments of FIG. 10, FIG. 11, FIG. 12A, FIG. 12B, FIG. 12C, FIG. 12D.

Systems and method described in certain embodiments herein introduce a workload-aware multi-link management system that determines the optimal link mode based on workload characteristics. The system may analyze a variety of features when deciding on the link mode for a workload, including system state, link and network states, workload priority and characteristics, and user characterization. The system executes an algorithm to compute a Jitter Sensitivity Score (JSS) based on these input features. The JSS may be compared to values associated with the network policy (e.g., a policy prioritizing one or more of performance, power saving, or balancing of the two) to determine whether an LLJ link is beneficial. If an LLJ link is determined to produce experience benefits for a given workload, then a Jitter Likelihood Score (JLS) may be computed for each supported multi-link configuration set using the link and network states. The multi-link set with the lowest JLS is selected for the workload. In some embodiments, the power impact of operating in a particular multi-link configuration may also be weighted with the JLS in selecting the optimal multi-link set. The selected configuration for the workload is passed to the network management service, which configures the communication link.

Figure 2:
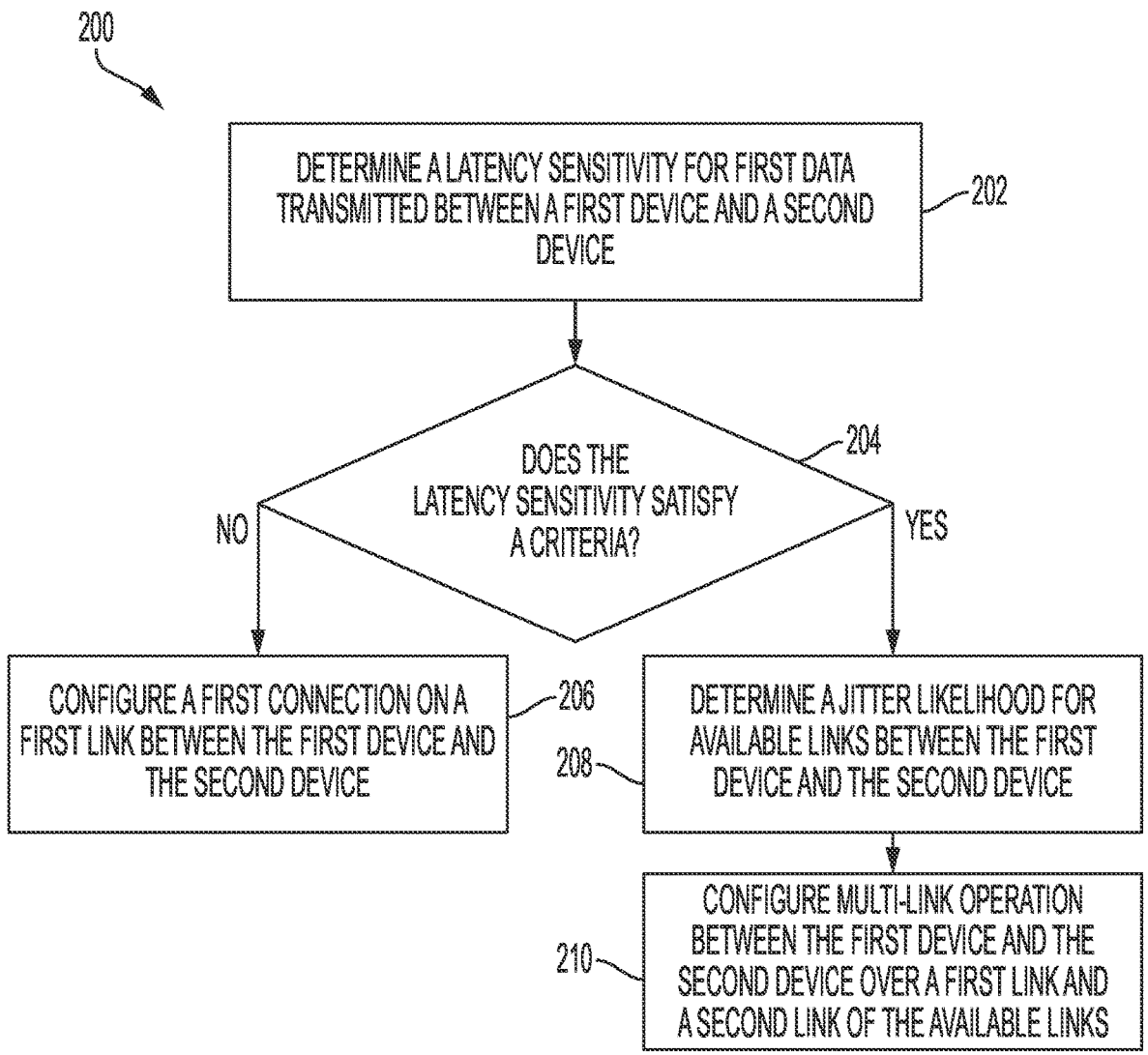
FIG. 2 is an example flow chart illustrating a method of configuring a communication link for transmission of data according to some embodiments of the disclosure.
Figure 3:
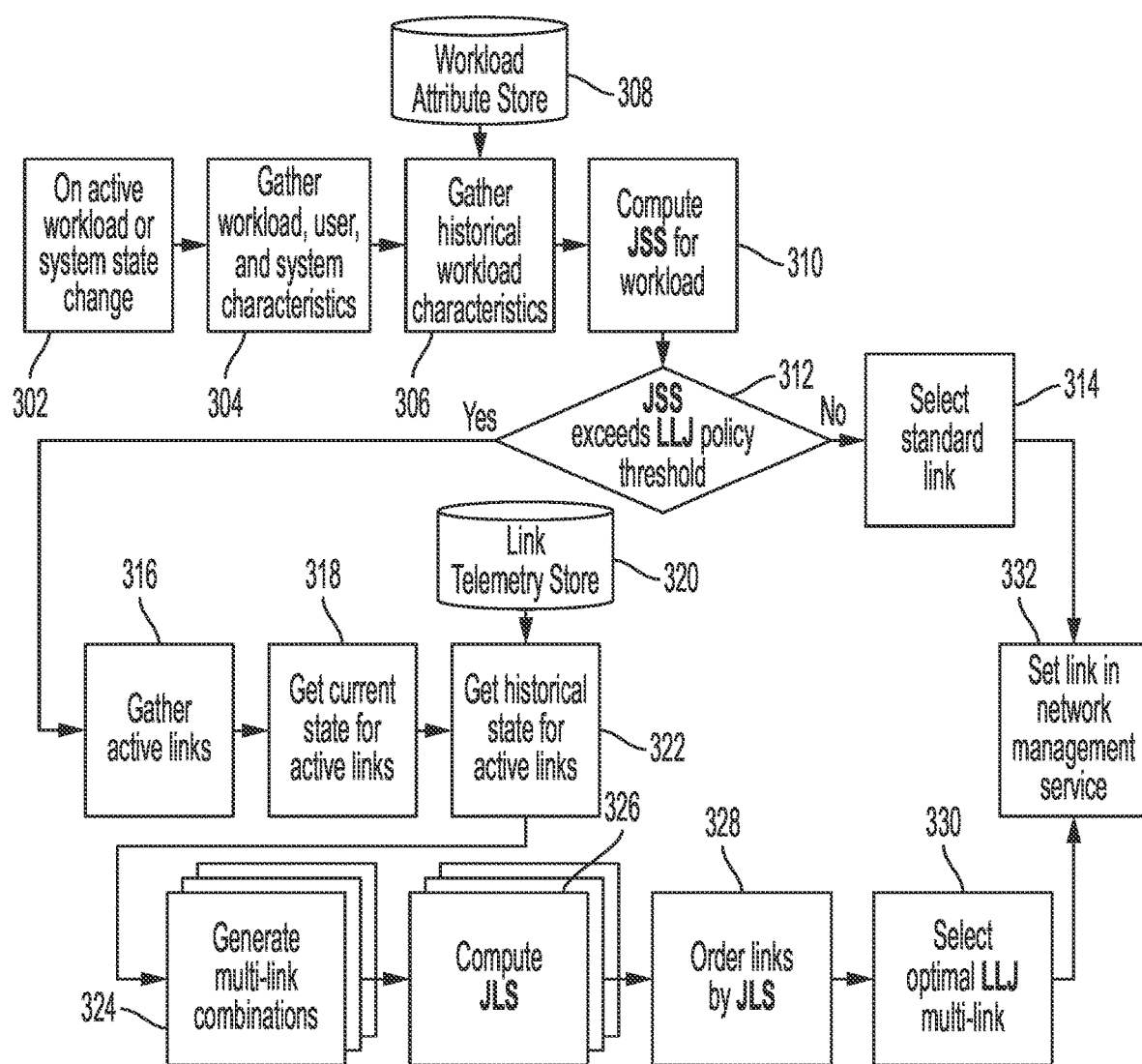
FIG. 3 is a block diagram illustrating a communication configuration system according to some embodiments of the disclosure.

One method for managing communication links by a device, such as by an information handling system, is shown in FIG. 2. FIG. 2 is an example flow chart illustrating a method of configuring a communication link for transmission of data according to some embodiments of the disclosure. Additional details for one implementation of the method of FIG. 2 are provided with reference to FIG. 3. FIG. 3 is a block diagram illustrating a communication configuration system according to some embodiments of the disclosure.

A method 200 includes, at block 202, determining a latency sensitivity for first data transmitted between a first device and a second device. In some embodiments, the latency sensitivity may be assigned to the first data by an application on the device transmitting the first data. In some embodiments, the latency sensitivity may be assigned to all data transmitted from a particular device. In some embodiments, the latency sensitivity may be determined using historical and/or current information regarding a device as shown in FIG. 3. For example, at block 302 an active workload or system state change may be detected that causes a redetermination of a latency sensitivity for first data. At block 304, workload, user, and system characteristics are received for a device. At block 306, historical workload characteristics may be received from a workload attribute store database 308. Information received at blocks 304 and 306 may be used to determine, at block 310, a jitter sensitivity score (JSS) for a workload carried by the first data.

Referring back to FIG. 2, at block 204, the determined latency sensitivity may be compared with criteria specified in a policy. If the latency satisfies the criteria the method 200 continues to block 206 to apply one configuration for transmission of the first data. If the latency does not satisfy the criteria the method 200 continues to blocks 208, 210 to apply a different configuration for transmission of the first data. Although one criteria with two outcomes is shown in FIG. 2. A policy may specify additional criteria for determining whether to apply a first configuration in block 206 or a second configuration in blocks 208, 210. A policy may also specify additional configurations with the additional criteria for applying one of N configurations for a communications link based on M criteria. For example, the policy may specify based on certain criteria whether to activate a multi-link operation on the communication links at blocks 208, 210, and may also specify which configuration to apply based on the criteria, such as whether to apply the configuration of FIG. 6, FIG. 7, FIG. 8, FIG. 9, or other embodiments of the disclosure.

One example criteria for a policy evaluation at block 204 is whether the latency sensitivity is below a threshold value. A latency sensitivity below the threshold may be used alone or in part to determine the first data is delay-sensitive data. A latency sensitivity above the threshold may be used alone or in part to determine the first data is normal traffic with no delay sensitivity. Another example policy evaluation is shown in FIG. 3. At block 312, the determined JSS at block 310 may be compared to a low latency jitter (LLJ) policy threshold.

Referring back to FIG. 2, not satisfying the low latency criteria of block 204 results in the method 200 continuing to block 206 to configure a first connection on a first communication link between the first device and the second device for communicating the first data. The first connection configured at block 206 may provide normal data traffic with no additional operations to reduce sensitivity on the first connection because the first data was determined to not be sensitive to delay. In some embodiments, transmission at block 206 may include activating bandwidth aggregation between two available frequency bands. That is, bandwidth aggregation may be applied when two physical radios are available for multi-link operation to reduce latency but multi-link operation is not used. In some embodiments, the first device may determine, based on an amount of data generated by the application, the application, and/or the type of application, whether to activate bandwidth aggregation. Thus, the first device may re-configure two or more of a set of communications links between single operation, bandwidth aggregation operation, and multi-link operation.

In the example embodiment of FIG. 3, the configuration may include determining a standard communication link at block 314 and setting the standard communication link for transmission in a network management service at block 332. For example, block 314 may select a wireless channel and transmit the first data over the wireless channel with no additional latency-reducing operations.

Referring back to FIG. 2, satisfying the low latency criteria of block 204 results in the method 200 configuring a communications link for low latency traffic. The configuration may include, for example, identifying a particular channel with reduced latency for establishing the communication link and/or establishing the communication link with additional configurations, such as multi-link, to reduce the delay on the communication link. One embodiment for configuring the low latency communication link may include, at block 208, determining a jitter likelihood for available links and configurations between the first device and second device. Subsequently, at block 210, a multi-link channel is configured between the first device and the second device using a first communication link and a second communication link that are selected based on the determined jitter likelihoods of block 208.

In the example embodiment of FIG. 3, the evaluation at block 312 may result in determining the data is delay sensitive and the processing continues to block 316 to determine a set of active communication links. At block 318, a current state for each of the active links is determined. At block 322, historical state information for the set of active links may be retrieved from a link telemetry store database 320. The historical state information may include information regarding conditions of the links at various times of the day, at various weather conditions, at various times of the year, etc. For example, the historical state information may indicate that a particular link, such as a 5 GHz frequency band in a house, is historically noisy during the afternoon and evening at times after the family members return home from school and work. As another example, the historical state information may indicate that a particular public WiFi network has high latency around lunch time when visitors are communicating on the public WiFi network at lunch time.

Permutations of multi-link configurations may be determined at block 324 to generate a set of available multi-link configurations based on the set of available links. At block 326, a jitter likelihood score (JLS) may be determined for each of the set of available multi-link configurations based on the current state received at block 318, historical states received at block 322, and/or other information. At block 328, the set of available multi-link configurations may be ordered by criteria. The criteria may be specified by an operating policy on one of the first device or the second device communicating over the links, in which the policy may apply weights to criteria such as JLS, SNR, power requirements, etc. for communicating on each of the set of available multi-link configurations. In one example embodiment, the set of available multi-link configurations may be ordered by jitter link sensitivity (JLS) when the policy desires a lowest delay possible. At block 330, an optimal multi-link configuration is determined from the ordered list of block 328, such as by selecting the multi-link configuration with lowest JLS, which is set in a network management service at block 332 for communicating first data.

Figure 4:
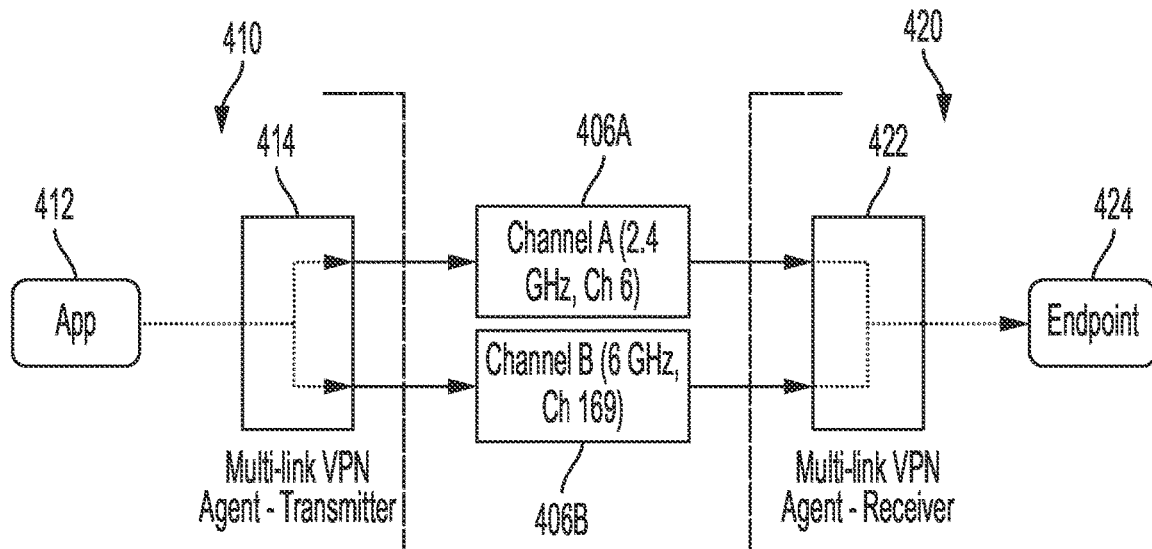
FIG. 4 is a block diagram illustrating a multi-link combination of communication channels according to some embodiments of the disclosure.

One example embodiment of a multi-link combination that may be used in configuring low latency jitter (LLJ) connectivity is shown in FIG. 4. FIG. 4 is a block diagram illustrating a multi-link combination of communication channels according to some embodiments of the disclosure. Endpoint 412 on a first device 410 may transmit first data to endpoint 424 on a second device 420. The endpoints 412 and 424 may be applications executing on the devices 410 and 420, respectively. Multiple links may be supported through virtual private network (VPN) agents 414 and 422 on the devices 410 and 420, respectively. The VPN agents 414 and 422 may receive data from the end points 412 and 424, respectively, and process for transmission over two or more communication channels 406A-B. In some embodiments, the channels 406A-B may be different frequency bands in unlicensed wireless spectrum. For example, channel 406A may be channel 6 in the 2.4 GHz unlicensed spectrum and channel 406B may be channel 169 in the 6 GHz unlicensed spectrum. In some embodiments, the channels 406A-B may implement different wireless radio access technologies (RATs). For example, channel 406A may be a personal area network (PAN) communications link, such as Bluetooth, and channel 406B may be a channel in the 5 GHz unlicensed spectrum for 802.11 Wi-Fi. In some embodiments, first data transmitted from the first device 410 to the second device 420 may be duplicated by the VPN agent 414 of the first device 410. The first data is packaged and transmitted over both of the channels 406A and 406B. The VPN agent 422 of the second device 420 receives the transmissions on both channels 406A-B and processes the first received copy of duplicate data for consumption by endpoint 424, while discarding the second received copy of the duplicate data. The redundant transmission over channels 406A-B reduces the likelihood that momentary interference on one of the channels 406A-B will result in delay of the delay-sensitive data. That is, an interference on channel 406A is unlikely to disrupt communication on channel 406B. Because interference is generally random in nature, interference is unlikely to affect both channel 406A and 406B at the same time.

The system of FIG. 4 use multi-link virtual private network (ML-VPN) to achieve Low Latency Jitter (LLJ) connectivity between the first device 410 and the second device 420. The system may provide certain server/client devices with the ability to support multi-link connectivity for Low Latency Jitter. A handshake technique may be used between a server and client device to share capability information as part of a bonding procedure to establish the ML-VPN or other multi-link connections for low latency jitter communications.

The multi-link connection may establish two (or more) IP network connections from a ML-VPN server/hub device to a ML-VPN client/display device over different Wi-Fi channels, such as channel 6 and channel 169, in different bands, such as 2.4 GHz and 6 GHz. In some embodiments, the different channels may be operated using two radios at the physical level to transmit and receive on different frequency bands, such as in the embodiment of FIG. 6 described below. In some embodiments, a single radio may be used with enhanced multi-link support to listen on two frequency bands. Two IP links may be established at the media access control (MAC) level, with packets sent only on the first available band, such as in the embodiment of FIG. 7 described below.

Figures 6, 7:
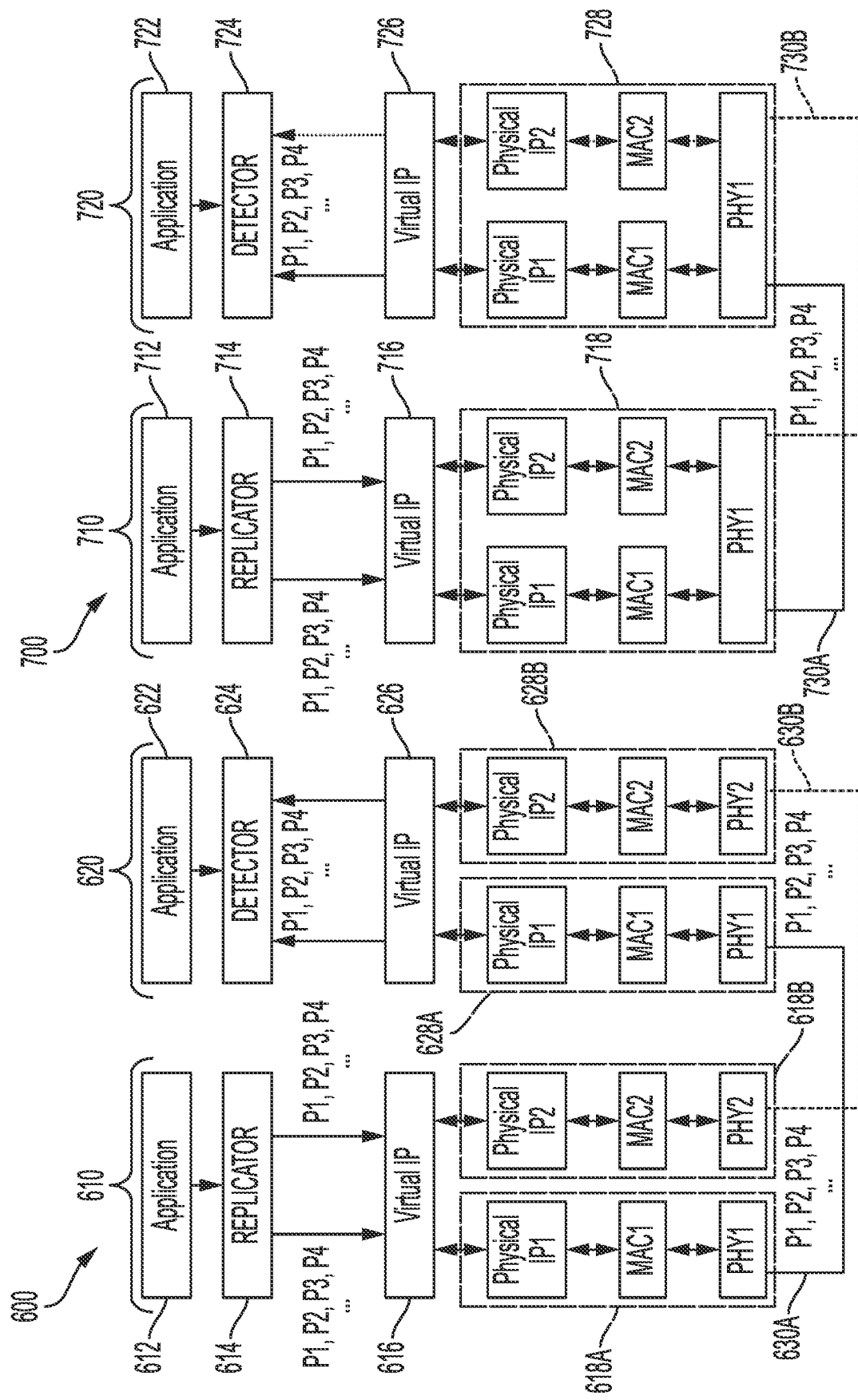
FIG. 6 is a block diagram illustrating a dual-physical radio for multi-link operation according to some embodiments of the disclosure.
FIG. 7 is a block diagram illustrating a single-physical radio for multi-link operation according to some embodiments of the disclosure.

In some embodiments, classification and replication of data from target applications can be performed in layer 3 on the ML-VPN server device and data can be routed towards two different IP addresses as shown in the embodiments of FIG. 6 and FIG. 7. In some embodiments, the replicator and detector can be implemented in layer 2, such as in IPSec. The replicated data may be sent using a single or double physical layer radio system as shown in the embodiments of FIG. 8 and FIG. 9, respectively. In the embodiments of FIG. 6 and FIG. 8, the data is transmitted concurrently on two (or more) PHY implementations. In the embodiments of FIG. 7 and FIG. 9, the data is transmitted using the fastest channel in a single PHY implementation. The detector on the receiver device detects and processes the first-to-arrive packet frame and discards redundant packet frame (e.g., second-to-arrive or later-to-arrive).

Figure 5:
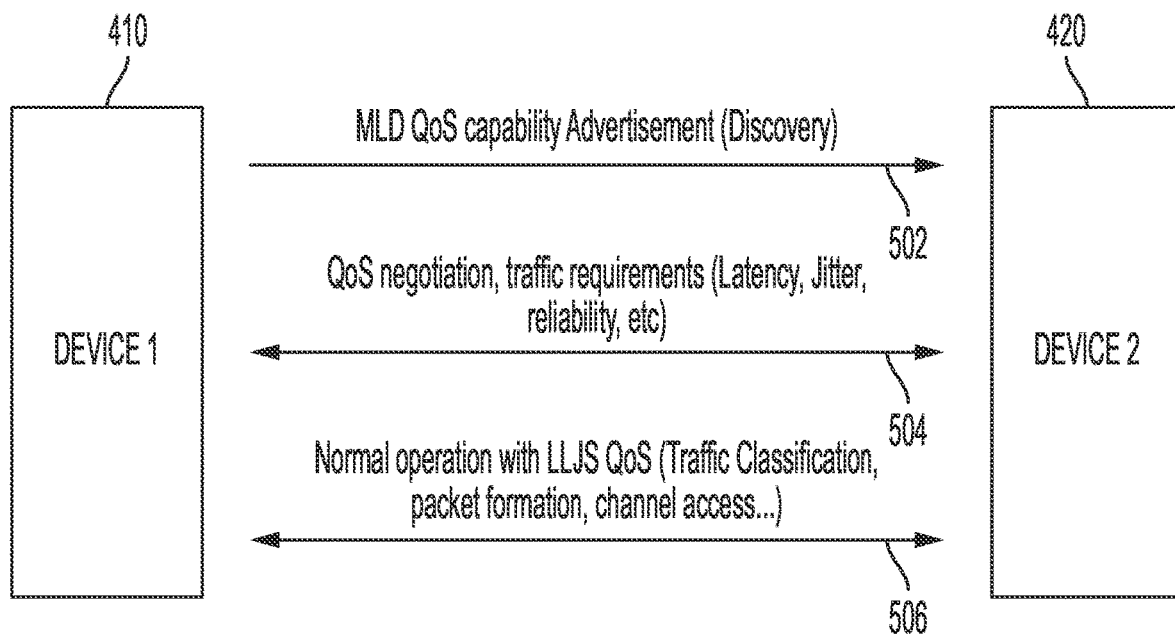
FIG. 5 is a block diagram illustrating a multi-link configuration handshake operation according to some embodiments of the disclosure.

When first device 410 and second device 420 establish a communications session, the devices may perform a handshake operation to establish the capabilities of each of the devices 410 and 420, discover overlapping capabilities, and determine whether to establish a multi-link configuration. The handshake allows configuring the communications links to reduce latency when supported by both devices. FIG. 5 is a block diagram illustrating a multi-link configuration handshake operation according to some embodiments of the disclosure. Device 410 may, at step 502, transmit Multi-link Device (MLD) STAs to discover which APs (or Soft APs) support QoS operations and start a QoS negotiation session. No QoS negotiation may be used for regular STAs that don't implement new QoS capabilities. At step 504, the QoS negotiation may proceed based on device 410 determining that device 420 supports new QoS capabilities or specifically supports multi-link configurations. The negotiation may include indicating traffic requirements, such as latency, jitter, reliability, etc. The multi-link configuration may then be established based on known traffic requirements, such as by comparing the traffic requirements with an active policy on the device 410 to determine a low latency connection should be established and subsequently selecting an optimal LLJ multi-link. At block 506, normal operation allows the transmission of first data with LLJS QoS applied, such as through one of the configurations described in the embodiments of FIG. 6, FIG. 7, FIG. 8, or FIG. 9. In some embodiments, certain applications, destinations, and/or categories of applications may be whitelisted for LLJ connections. Thus, the multi-link configuration may only be applied when certain types of data are being transmitted between the first device and the second device. This may reduce unnecessary power consumption resulting from multi-link configurations being used for normal data that is not sensitive to latency. Example applications whitelisted for LLJ connections can include gaming applications, display replication applications, and/or real-time control applications (such as in manufacturing).

The multi-link configuration may be enabled in some non-limiting embodiments through the configuration of a replicator and a detector in a layer 3 (L3) configuration on the first device and the second device, such as the embodiments of FIG. 6, FIG. 7, FIG. 8, or FIG. 9.

FIG. 6 is a block diagram illustrating a dual-physical radio for multi-link operation according to some embodiments of the disclosure. A communications session 600 may be between a first device 610 and a second device 620 may involve transmission of application data from application 612 to application 622. A replicator 614 on device 610 replicates packets for transmission through multiple links. For example, packets P1, P2, P3, P4, . . . PN containing application data from application 612 are duplicated as two sets of packets sent through a virtual IP block 616 to physical radios 618A and 618B. The virtual IP block 616 may represent an application that uses virtual IP networks (in contrast to physical IP networks) to tunnel network traffic over a single TCP/UDP port. The virtual IP block 616 may allow insanitation of multiple Virtual IP networks, and then use one or more physical IP ports to route network data. The physical radios 618A and 618B may processes replicated copies of the packets P1-PN through two physical IP blocks, two MAC layers, and two corresponding physical layers. The result is that the packets P1-PN are transmitted in duplicate over links 630A and 630B, which may be different RATs, frequency bands, or frequency channels.

The packets are received at device 620 through two physical radios 628A-B receiving and processing data from links 630A-B, respectively. The virtual IP block 626 assembles the packets, which are passed to a detector 624. The detector 624 determines that replicated copies of packets are received and keeps one copy of the packet while discarding the other copy (or copies) of the packet. For example, the detector 624 may keep the first packet to arrive at the device 620 and discard later copies of the packet. The detector 624 provides a stream of the first-received packets to the application 622 for processing.

Variations of the communication session 600 may be made without departing from the use of replicated packets to reduce latency when communicating between device 610 and 620. For example, although two physical radios and two sets of duplicated packets are shown, additional physical radios and additional duplicates of the original packets may be used to provide multi-link communication sessions over three or more communication links. As another example, the session 600 reflects data transmission from device 610 to 620, however device 620 may be similarly configured as device 610 for transmission from device 620 to device 610. That is, device 620 may also include a replicator and device 610 may also include a detector.

In another embodiment, multi-link operation may be performed with a single radio interface as shown in FIG. 7. FIG. 7 is a block diagram illustrating a single-physical radio for multi-link operation according to some embodiments of the disclosure. A communication session 700 between device 710 and device 720 may include an application 712 on device 700 generating data packaged into replicated packets at replicator 714. Communications between the devices may include an enhanced multi-link single radio (eMLSR). In this mode, a device listens on two bands then receive or transmit on first available band. The replicated sets of packets are passed through virtual IP block 716, which provides the replicated packets to physical radio 718 for transmission over communications links 730A and/or 730B. The packets are processed through separate physical IP blocks and separate MAC blocks in physical radio 718 but transmitted through one physical block 718. The physical block 718 selects one of the communications links 730A and 730 for transmission based on determined latency for each of the links 730A-B. The determination may be made on a packet-by-packet basis or at longer time intervals such as every four packets or every four seconds or at predetermined times. In some embodiments, the radio will check for link quality based on the link quality metrics such as bit-error rate (BER) or packet error-rate (PER) and adjust the band/channel selection. A callout driver may be used to actively detect quality of the link based on RSSI, interference information and/or historical data on the channel performance and trigger channel/band change. In some embodiments, the channels/bands may be determined at start-up of the system or the communication session, and the defined channels are then used for rest of the session.

The device 720 receives packets from both communications links 730A and/or 730B and processes packets through physical radio 728 for delivery to virtual IP block 726, to detector 724, and ultimately to the application 722. Operation of blocks above the physical radio PHY1 in device 710 and device 720 may be similar to that of FIG. 6.

In some embodiments, the replicator and detector for the multi-link operations may be implemented in an Internet Protocol Security (IPSec) layer. FIG. 8 is a block diagram illustrating a dual-physical radio for multi-link operation according to some embodiments of the disclosure. A communications session 800 between device 810 and device 8 20 is shown. An application 812 executing on device 810 generates application data that is passed to a destination IP block 814, which forms packets P1, P2, P3, P4, . . . , PN passed to replicator 816. Replicator 816 replicates packets P1-PN for multi-link communications. For example, a first copy is passed to physical radio 818A and a second copy is passed to physical radio 818B. Physical radios 818A-B transmit the packets over communications links 830A-830B, respectively.

On device 820, physical radios 828A-B receive packets transmitted over communications links 830A-B, respectively, and form packets P1-Pn that are provided to detector 826. Detector 826 assembles a single set of low-latency packets P1-PN for destination IP block 824, which are provided to application 812. The replicator 816 ad detector 826 may be implemented as part of an IPSec layer within the devices 810 and 820.

In another embodiment, multi-link operation with IPSec may be performed with a single radio interface as shown in FIG. 9. FIG. 9 is a block diagram illustrating a single-physical radio for multi-link operation according to some embodiments of the disclosure. A communications session 900 between device 910 and device 920 may be established with multi-link operation to provide low latency jitter. An application 912 generates application data provided to destination IP block 914, which forms packets P1, P2, P3, P4, . . . PN, provided to replicator 916. Replicator 916 replicates packets from the IP block 914 into multiple streams that are provided to single physical radio 918. The physical radio 918 may support transmission over multiple communications links 930A-B. The physical radio 918 may transmit one of the replicated packets over a determined one of the communications links 930A-B based on, for example, an estimated latency under current conditions to determine a lowest predicted latency communications link.

A single physical radio 928 on device 920 receives data transmitted over communications links 930A-B and forms streams of packets P1, P2, P3, P4, . . . , PN, which are passed to the detector 926. The detector assembles the low latency jitter (LLJ) collection of packets for the destination IP block 924, which are supplied to the application 922. The embodiments of FIG. 6 and FIG. 7 differ from the embodiments of FIG. 8 and FIG. 9 in one manner in that the replication of the packets occurs at a higher level of the protocol stack on the devices in FIG. 6 and FIG. 7 than in the devices in FIG. 8 and FIG. 9. In the communications sessions of FIG. 8 and FIG. 9, the replication and detection occurs at layer 2 or layer 3 as part of a virtual private network (VPN) connection. In the communications sessions of FIG. 6 and FIG. 7, the replication and detection occurs at layer 3 or above.

The replication of packets for transmission during multi-link operations decreases latency jitter of the packets arriving at the destination because interference on a first channel may be compensated for through a second channel operating in parallel with the first channel. Interference on the first channel is unlikely to occur at the same time as interference on the second channel, such that latency introduced by interference may be reduced or avoided. The reduction in latency is shown through measurements of communications sessions with and without multi-link operation as shown in the graphs of FIG. 10A and FIG. 10B.

Figure 10A:
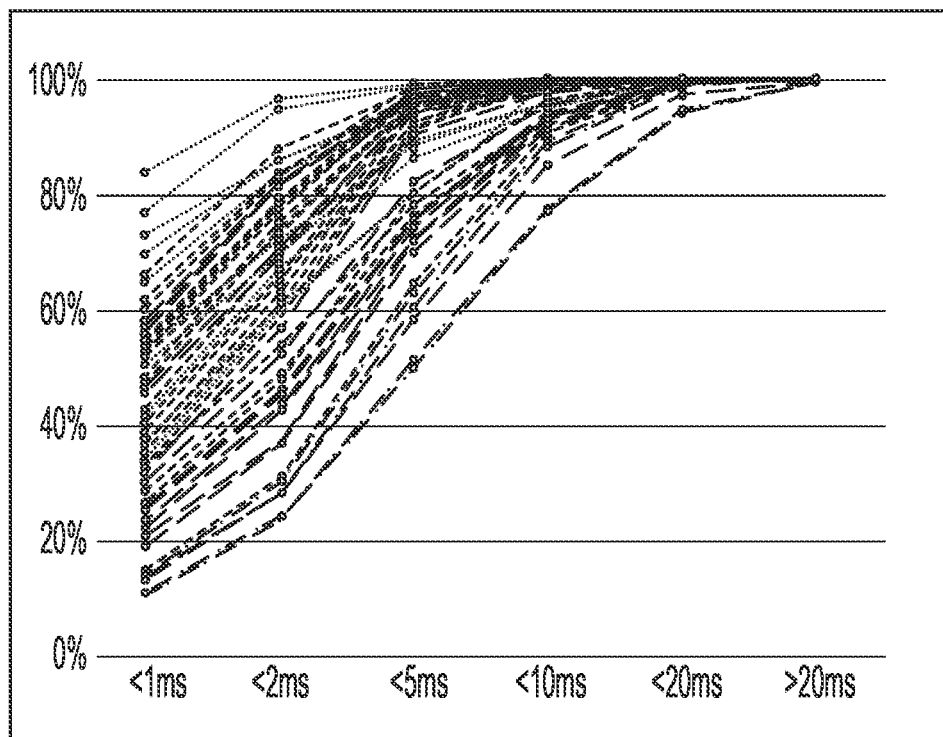
FIG. 10A is a graph illustrating latency measurements with multi-link operation according to some embodiments of the disclosure.
Figure 10B:
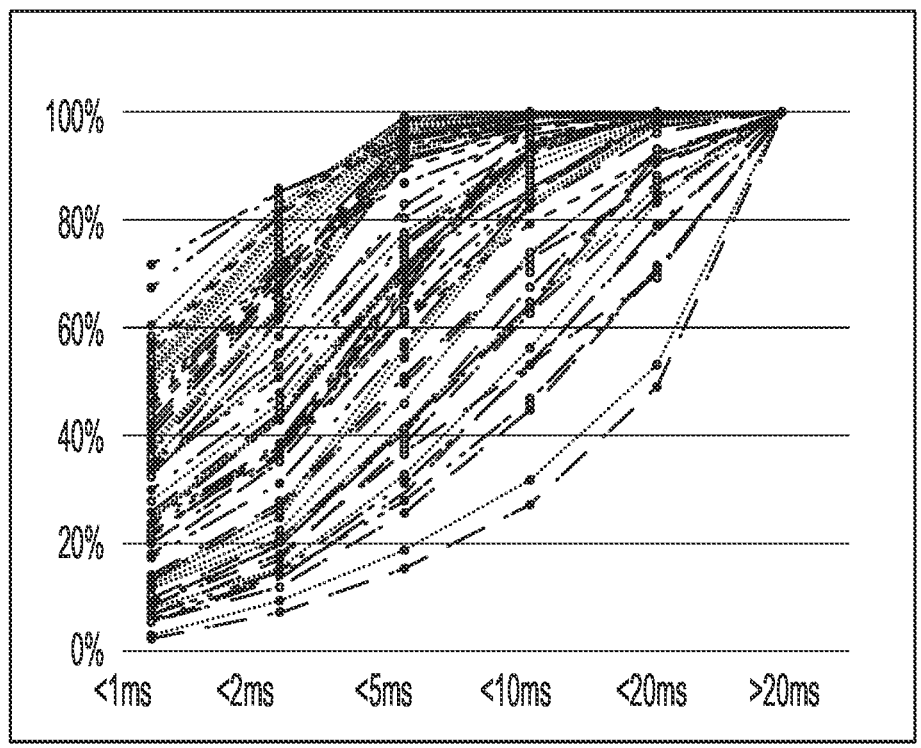
FIG. 10B is a graph illustrating latency measurements without multi-link operation according to some embodiments of the disclosure.

FIG. 10A is a graph illustrating latency measurements with multi-link operation according to some embodiments of the disclosure. Most of the time latency between the two devices is at or below 1 millisecond (1 ms). FIG. 10B is a graph illustrating latency measurements without multi-link operation according to some embodiments of the disclosure. Most of the time latency is at or below 20 milliseconds (20 ms). The decrease in latency in multi-link operation is thus twenty-fold but may be more or less depending on particular conditions in the wireless environment.

These example embodiments describe and illustrate various aspects of a configurable and dynamic operation involving multi-link operations that may be used to support a gaming environment through the use of a hub device, which may be the access point 110 of FIG. 1 or another information handling system shown in FIG. 1. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

Supporting multiple devices and controllers simultaneously may create a noisy environment for wireless communications channels. The noisy environment may increase delay on network traffic that results in a poor user experience from stuttering or choppy AV delivered to a display device. The devices and hub may support multi-link operations within the user's home as described in embodiments described above to reduce the latency jitter in the wireless environment and improve the user experience executing gaming sessions within the home environment. Additional details of a home environment are described with respect to FIG. 11, FIG. 12, FIG. 13A, FIG. 13B, FIG. 13C, and FIG. 13D, however multi-link operations may be employed in other environments as well.

Figure 11:
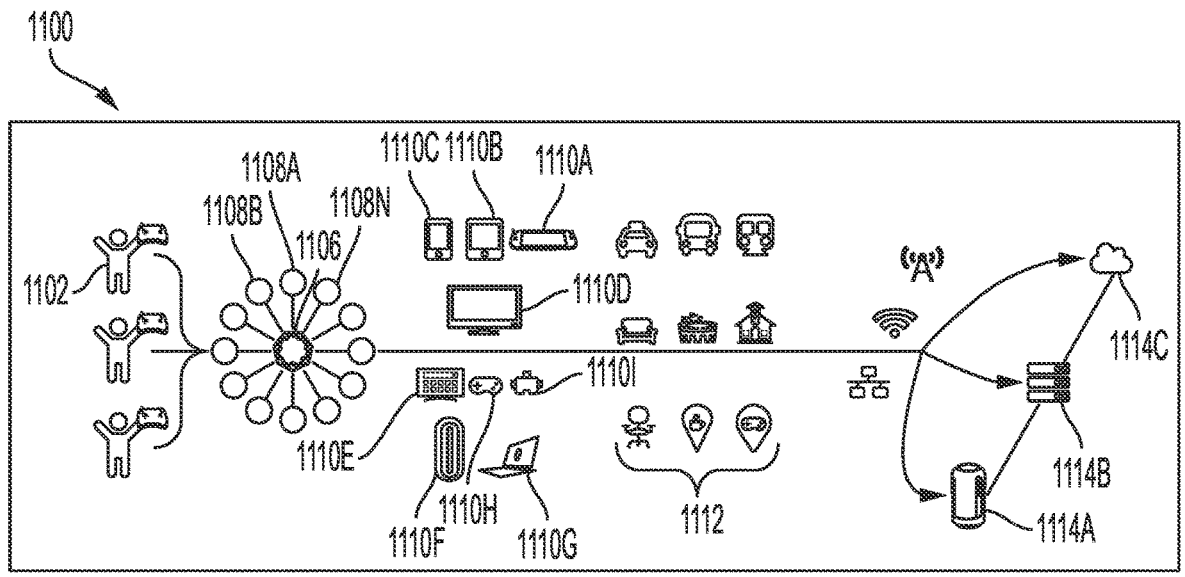
FIG. 11 is a block diagram illustrating aspects of a configurable system for providing services to users according some embodiments of the disclosure.

FIG. 11 is a block diagram illustrating aspects of a configurable system for providing services to users according some embodiments of the disclosure. A system 1100 includes users 1102 who may have access to a shared library of applications 1106 including applications 1108A-1108N. The users 1102 may have separate libraries, with some overlapping applications between the libraries. The users 1102 may access the library 1106 through devices 1110A-I, such as mobile gaming device 1110A, tablet computing device 1110B, phone computing device 1110C, television 1110D, personal computing device 1110E, desktop computing device 1110F, laptop computing device 1110G, game controller 1110H, VR headset 1110I. The devices 1110 may access services at any of locations 1112, including cars, busses, homes, hotels, offices, parks, etc. One or more of the devices 1110 may communicate with an application session executing on a computing device 1114, such as a home application hub 1114A, a server 1114B, or a cloud execution environment 1114C. In some embodiments, environments may only exist for fixed devices, e.g., desktop computers, televisions, etc.

Figure 12:
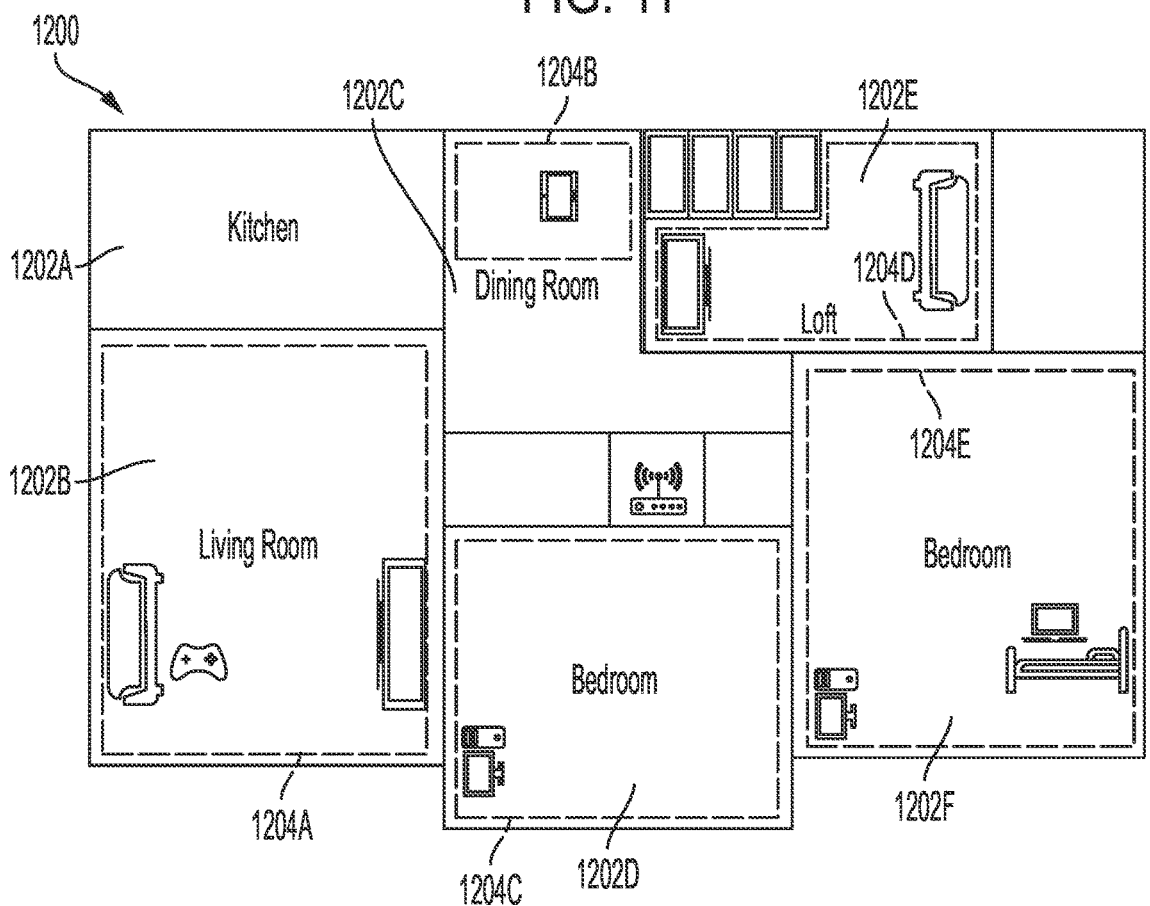
FIG. 12 is a block diagram illustrating possible game environments according to some embodiments of the disclosure.

FIG. 12 is a block diagram illustrating possible game environments according to some embodiments of the disclosure. A user's home 1200 may include rooms 1202A-F, and each of the rooms may have different information handling systems present, different AV equipment present, and/or different characteristics. For example, a living room 1202B may include a large-size television, a bedroom 1202D may include a personal computer, and a dining room 1202C may include a table computing device. Gaming environments 1204A-E in the home 1200 may be defined based on spaces where a user is likely to execute an application session. Each gaming environment 1204A-E may include numerous devices and gaming environments, devices that may or may not be capable of hosting games, and/or devices that may or may not be capable of receiving game output. A system 1100 may allow multiple users in the home 1200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 1204A-E within the home 1200 and continue an application session. For example, a user may take a device, such as a gaming controller, from environment 1204A to environment 1204C. The gaming controller may migrate and reconfigure for operation in environment 1204C from a configuration for environment 1204A. For example, the controller may transition from an application hosted on a TV in living room 1202B to an application hosted on TV in dining room 1202C while remaining connected to a host service executing on a PC in bedroom 1202D. When reconfiguring for different environments, the methods of FIG. 2, FIG. 3, and FIG. 5 may be repeated to establish low latency jitter (LLJ) multi-link operation based on environmental conditions for RF signals in the wireless environment around the environments 1204A-E.

Figure 13A:
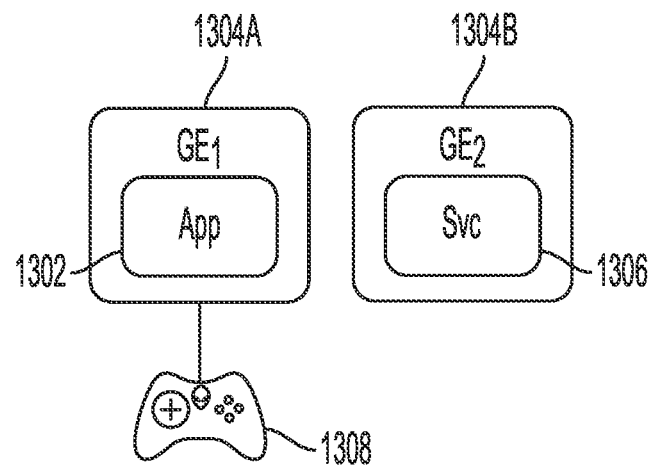
FIG. 13A is a block diagram illustrating application and services hosted in different gaming environments according to some embodiments of the disclosure.

Example configurations for applications and services in gaming environments are shown in FIGS. 13A-13D. FIG. 13A is a block diagram illustrating application and services hosted in different gaming environments according to some embodiments of the disclosure. In FIG. 13A, a first gaming environment 1304A may include a device, such as a TV or PC, hosting an application 1302, which is an endpoint for an application session such as a gaming session. The application 1302 communicates with a service 1306, which may be hosted on a device in a different gaming environment 1304B. A controller 1308 may communicate with the application 1302 to receive user input for the application session to control, for example, a character in a game. In some embodiments, the controller 1308 is connected to the environment 1304A hosting the application and the I/O is configured to be relayed to the environment 1304B hosting the actual game.

Figure 13B:
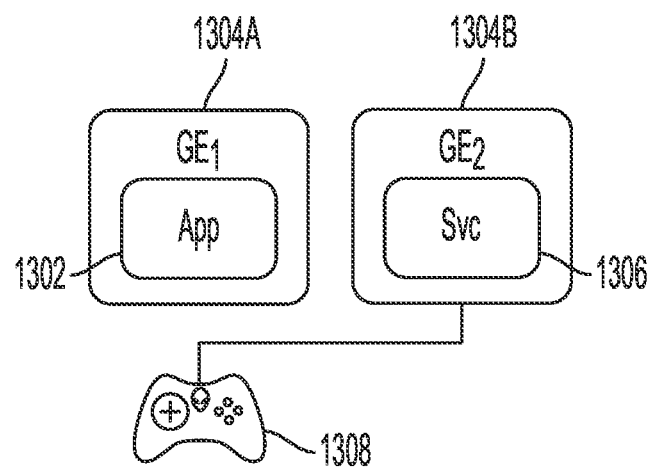
FIG. 13B is a block diagram illustrating application and services hosted in different gaming environments according to some embodiments of the disclosure.

Another arrangement for the application and service is shown in FIG. 13B. FIG. 13B is a block diagram illustrating application and services hosted in different gaming environments according to some embodiments of the disclosure. In FIG. 13B, the controller 1308 communicates with the service 1306 for providing user input to an application session, with the AV rendering target of the application session being application 1302 in a different gaming environment.

Figure 13C:
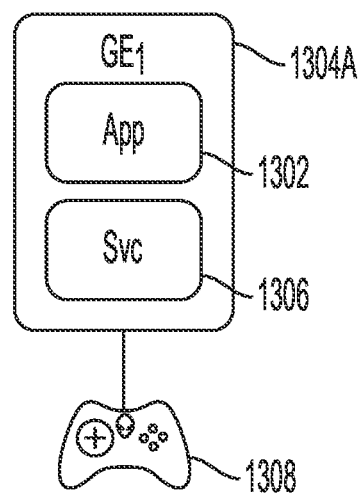
FIG. 13C is a block diagram illustrating application and service hosted in a common gaming environment according to some embodiments of the disclosure.

Another arrangement for the application and service is shown in FIG. 13C. FIG. 13C is a block diagram illustrating application and service hosted in a common gaming environment according to some embodiments of the disclosure. In FIG. 13C, the application 1302 and the service 1306 are executed in the same gaming environment 1304A, which may be a single device, two devices, or a combination of devices in the gaming environment 1304A. The controller 1308 may communicate with either the service 1306 and/or the application 1302.

Figure 13D:
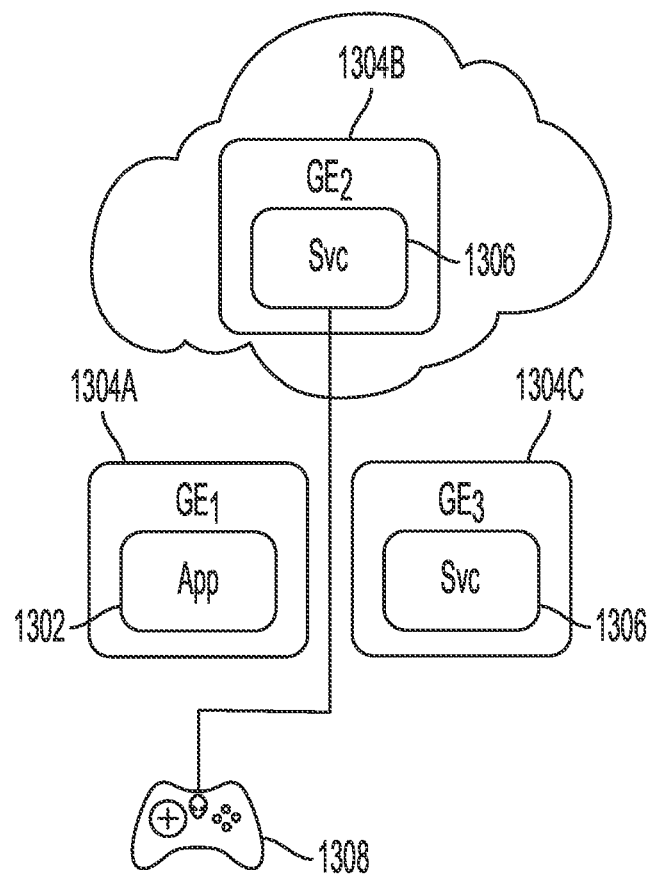
FIG. 13D is a block diagram illustrating a cloud-based service arrangement for a gaming environment according to some embodiments of the disclosure.

A further arrangement for the application and service is shown in FIG. 13D. FIG. 13D is a block diagram illustrating a cloud-based service arrangement for a gaming environment according to some embodiments of the disclosure. In FIG. 13D, the controller 1308 may communicate with a service 1306 hosted in a gaming environment 1304B that is remote from the gaming environment 1304A in which the application 1302 is executing. The service 1306 may be executing, for example, on a remote device, such as when the user's home includes the gaming environment 1304B but the user is engaging with application 1302 at a location on a different network from their home (e.g., at a friend's house). The service 1306 may also or alternatively be executed, for example, on a cloud computing device available as a subscription service to the user.

Figure 14:
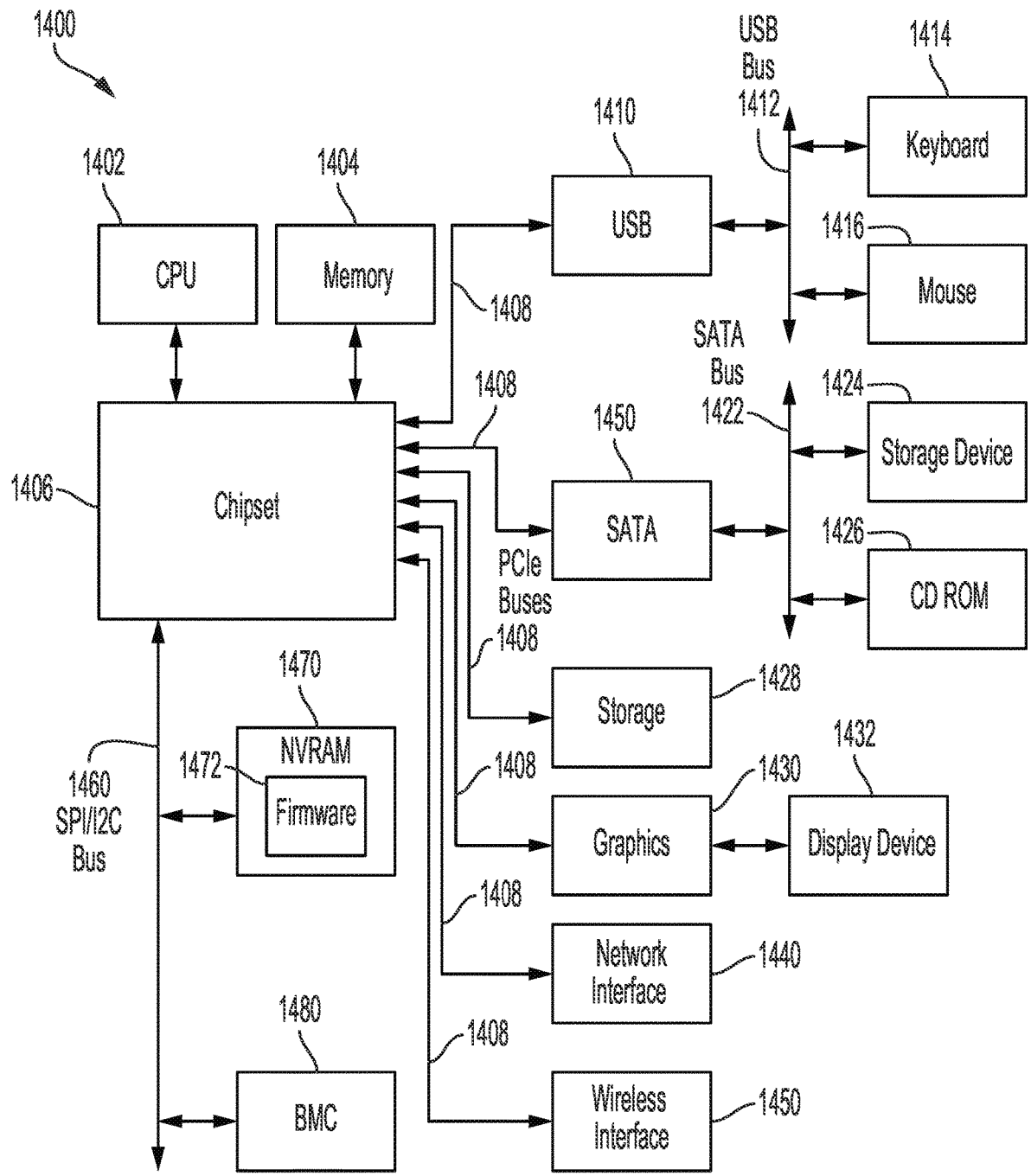
FIG. 14 is a schematic block diagram of an example information handling system according to some embodiments of the disclosure.

FIG. 14 illustrates an example information handling system 1400. Information handling system 1400 may include a processor 1402 (e.g., a central processing unit (CPU)), a memory (e.g., a dynamic random-access memory (DRAM)) 1404, and a chipset 1406. In some embodiments, one or more of the processor 1402, the memory 1404, and the chipset 1406 may be included on a motherboard (also referred to as a mainboard), which is a printed circuit board (PCB) with embedded conductors organized as transmission lines between the processor 1402, the memory 1404, the chipset 1406, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1402, the memory 1404, the chipset 1406, and/or other components may be organized as a System on Chip (SoC).

The processor 1402 may execute program code by accessing instructions loaded into memory 1404 from a storage device, executing the instructions to operate on data also loaded into memory 1404 from a storage device, and generate output data that is stored back into memory 1404 or sent to another component. The processor 1402 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1402 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1406 may facilitate the transfer of data between the processor 1402, the memory 1404, and other components. In some embodiments, chipset 1406 may include two or more integrated circuits (ICs), such as a northbridge controller coupled to the processor 1402, the memory 1404, and a southbridge controller, with the southbridge controller coupled to the other components such as USB 1410, SATA 1420, and PCIe buses 1408. The chipset 1406 may couple to other components through one or more PCIe buses 1408.

Some components may be coupled to one bus line of the PCIe buses 1408, whereas some components may be coupled to more than one bus line of the PCIe buses 1408. One example component is a universal serial bus (USB) controller 110, which interfaces the chipset 1406 to a USB bus 1412. A USB bus 1412 may couple input/output components such as a keyboard 1414 and a mouse 1416, but also other components such as USB flash drives, or another information handling system. Another example component is a SATA bus controller 1420, which couples the chipset 1406 to a SATA bus 1422. The SATA bus 1422 may facilitate efficient transfer of data between the chipset 1406 and components coupled to the chipset 1406 and a storage device 1424 (e.g., a hard disk drive (HDD) or solid-state disk drive (SDD)) and/or a compact disc read-only memory (CD-ROM) 1426. The PCIe bus 1408 may also couple the chipset 1406 directly to a storage device 1428 (e.g., a solid-state disk drive (SDD)). A further example of an example component is a graphics device 1430 (e.g., a graphics processing unit (GPU)) for generating output to a display device 1432, a network interface controller (NIC) 1440, and/or a wireless interface 1450 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 1406 may be directly connected to an individual end point via a PCIe root port within the chipset and a point-to-point topology as shown in FIG. 14.

The chipset 1406 may also be coupled to a serial peripheral interface (SPI) and/or Inter-Integrated Circuit (I2C) bus 1460, which couples the chipset 1406 to system management components. For example, a non-volatile random-access memory (NVRAM) 1470 for storing firmware 1472 may be coupled to the bus 1460. As another example, a controller, such as a baseboard management controller (BMC) 1480, may be coupled to the chipset 1406 through the bus 1460. BMC 1480 may be referred to as a service processor or embedded controller (EC). Capabilities and functions provided by BMC 1480 may vary considerably based on the type of information handling system. For example, the term baseboard management system may be used to describe an embedded processor included at a server, while an embedded controller may be found in a consumer-level device. As disclosed herein, BMC 1480 represents a processing device different from processor 1402, which provides various management functions for information handling system 1400. For example, an embedded controller may be responsible for power management, cooling management, and the like. An embedded controller included at a data storage system may be referred to as a storage enclosure processor or a chassis processor.

System 1400 may include additional processors that are configured to provide localized or specific control functions, such as a battery management controller. Bus 1460 can include one or more busses, including a Serial Peripheral Interface (SPI) bus, an Inter-Integrated Circuit (I2C) bus, a system management bus (SMBUS), a power management bus (PMBUS), or the like. BMC 1480 may be configured to provide out-of-band access to devices at information handling system 1400. Out-of-band access in the context of the bus 160 may refer to operations performed prior to execution of firmware 1472 by processor 1402 to initialize operation of system 1400.

Firmware 1472 may include instructions executable by processor 1402 to initialize and test the hardware components of system 1400. For example, the instructions may cause the processor 1402 to execute a power-on self-test (POST). The instructions may further cause the processor 1402 to load a boot loader or an operating system (OS) from a mass storage device. Firmware 1472 additionally may provide an abstraction layer for the hardware, such as a consistent way for application programs and operating systems to interact with the keyboard, display, and other input/output devices. When power is first applied to information handling system 1400, the system may begin a sequence of initialization procedures, such as a boot procedure or a secure boot procedure. During the initialization sequence, also referred to as a boot sequence, components of system 1400 may be configured and enabled for operation and device drivers may be installed. Device drivers may provide an interface through which other components of the system 1400 can communicate with a corresponding device. The firmware 1472 may include a basic input-output system (BIOS) and/or include a unified extensible firmware interface (UEFI). Firmware 1472 may also include one or more firmware modules of the information handling system. Additionally, configuration settings for the firmware 1472 and firmware of the information handling system 1400 may be stored in the NVRAM 1470. NVRAM 1470 may, for example, be a non-volatile firmware memory of the information handling system 1400 and may store a firmware memory map namespace 1400 of the information handling system. NVRAM 1470 may further store one or more container-specific firmware memory map namespaces for one or more containers concurrently executed by the information handling system.

Information handling system 1400 may include additional components and additional busses, not shown for clarity. For example, system 1400 may include multiple processor cores (either within processor 1402 or separately coupled to the chipset 1406 or through the PCIe buses 1408), audio devices (such as may be coupled to the chipset 1406 through one of the PCIe busses 1408), or the like. While a particular arrangement of bus technologies and interconnections is illustrated for the purpose of example, one of skill will appreciate that the techniques disclosed herein are applicable to other system architectures. System 1400 may include multiple processors and/or redundant bus controllers. In some embodiments, one or more components may be integrated together in an integrated circuit (IC), which is circuitry built on a common substrate. For example, portions of chipset 1406 can be integrated within processor 1402. Additional components of information handling system 1400 may include one or more storage devices that may store machine-executable code, one or more communications ports for communicating with external devices, and various input and output (I/O) devices, such as a keyboard, a mouse, and a video display.

In some embodiments, processor 1402 may include multiple processors, such as multiple processing cores for parallel processing by the information handling system 1400. For example, the information handling system 1400 may include a server comprising multiple processors for parallel processing. In some embodiments, the information handling system 1400 may support virtual machine (VM) operation, with multiple virtualized instances of one or more operating systems executed in parallel by the information handling system 1400. For example, resources, such as processors or processing cores of the information handling system may be assigned to multiple containerized instances of one or more operating systems of the information handling system 1400 executed in parallel. A container may, for example, be a virtual machine executed by the information handling system 1400 for execution of an instance of an operating system by the information handling system 1400. Thus, for example, multiple users may remotely connect to the information handling system 1400, such as in a cloud computing configuration, to utilize resources of the information handling system 1400, such as memory, processors, and other hardware, firmware, and software capabilities of the information handling system 1400. Parallel execution of multiple containers by the information handling system 1400 may allow the information handling system 100 to execute tasks for multiple users in parallel secure virtual environments.

The schematic flow chart diagrams of FIG. 2 and FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising: determining a latency sensitivity for first data for transmission over a multi-link virtual private network between a first device and a second device, wherein determining the latency sensitivity for first data comprises determining the latency sensitivity for first data based on historical workload characteristics of the first device; determining the latency sensitivity over the multi-link virtual private network satisfies a criteria, wherein the criteria comprises a first threshold corresponding to a first network policy and a second threshold corresponding to a second network policy, wherein the first network policy and the second network policy correspond to different power profiles; determining, in response to determining the latency sensitivity satisfies the criteria, a plurality of jitter likelihood values corresponding to a plurality of permutations of multi-link configurations, each of the plurality permutations comprising a plurality of wireless links between the first device and the second device, wherein the plurality of wireless links comprise a plurality of virtual private network links of the multi-link virtual private network; and configuring the multi-link virtual private network operation with a selected one of the plurality of permutations of multi-link configurations between the first device and the second device using a first link of the plurality of wireless links and a second link of the plurality of wireless links, wherein the selected one of the plurality of permutations is determined based on the plurality of jitter likelihood values and an associated power consumption with each of the corresponding plurality of permutations of multi-link configurations.

2. The method of claim 1, further comprising: replicating the first data as a first set of packets comprising the first data and a second set of packets comprising the second data; transmitting the first set of packets on the first link in the multi-link operation; and transmitting the second set of packets on the second link in the multi-link operation.

3. The method of claim 2, wherein: configuring multi-link operation comprises configuring a first physical radio for operation on a first frequency band for transmitting the first set of packets on the first link in the multi-link operation; and configuring multi-link operation comprises configuring a second physical radio for operation on a second frequency band for transmitting the second set of packets on the second link in the multi-link operation.

4. The method of claim 2, wherein: configuring multi-link operation comprises configuring a first physical radio for operation on a first frequency band and a second frequency band; transmitting the first set of packets comprises transmitting the first set of packets through the first physical radio on the first link in the multi-link operation; and transmitting the second set of packets comprises transmitting the second set of packets through the first physical radio on the second link in the multi-link operation.

5. The method of claim 1, wherein determining the plurality of jitter likelihood values corresponding to the plurality of links is based on historical data corresponding to the plurality of the links and current states of the plurality of the links.

6. The method of claim 1, further comprising: receiving, by the first device from the second device, a capability advertisement; and determining, by the first device, whether the second device supports multi-link operation based on the capability advertisement.

7. An information handling system, comprising: a memory; and a processor coupled to the memory and configured to perform operations comprising: determining a latency sensitivity for first data for transmission over a multi-link virtual private network between a first device and a second device, wherein determining the latency sensitivity for first data comprises determining the latency sensitivity for first data based on historical workload characteristics of the first device; determining whether the latency sensitivity over the multi-link virtual private network satisfies a criteria, wherein the criteria comprises a first threshold corresponding to a first network policy and a second threshold corresponding to a second network policy, wherein the first network policy and the second network policy correspond to different power profiles; and when the criteria is determined to be satisfied: determining a plurality of jitter likelihood values corresponding to a plurality of permutations of multi-link configurations, each of the plurality permutations comprising a plurality of wireless links between the first device and the second device, wherein the plurality of wireless links comprise a plurality of virtual private network links of the multi-link virtual private network; and configuring the multi-link virtual private network operation with a selected one of the plurality of permutations of multi-link configurations between the first device and the second device using a first link of the plurality of wireless links and a second link of the plurality of wireless links, wherein the selected one of the plurality of permutations is determined based on the plurality of jitter likelihood values and an associated power consumption with each of the corresponding plurality of permutations of multi-link configurations.

8. The information handling system of claim 7, wherein the processor is further configured to perform operations comprising: replicating the first data as a first set of packets comprising the first data and a second set of packets comprising the second data; transmitting the first set of packets on the first link in the multi-link operation; and transmitting the second set of packets on the second link in the multi-link operation.

9. The information handling system of claim 8, wherein: configuring multi-link operation comprises configuring a first physical radio for operation on a first frequency band for transmitting the first set of packets on the first link in the multi-link operation; and configuring multi-link operation comprises configuring a second physical radio for operation on a second frequency band for transmitting the second set of packets on the second link in the multi-link operation.

10. The information handling system of claim 8, wherein: configuring multi-link operation comprises configuring a first physical radio for operation on a first frequency band and a second frequency band; transmitting the first set of packets comprises transmitting the first set of packets through the first physical radio on the first link in the multi-link operation; and transmitting the second set of packets comprises transmitting the second set of packets through the first physical radio on the second link in the multi-link operation.

11. The information handling system of claim 7, wherein determining the latency sensitivity for first data comprises determining the latency sensitivity for first data based on historical workload characteristics of the first device.

12. The information handling system of claim 7, wherein determining the plurality of jitter likelihood values corresponding to the plurality of links is based on historical data corresponding to the plurality of the links and current states of the plurality of the links.

13. The information handling system of claim 7, wherein the processor is further configured to perform operations comprising: receiving, by the first device from the second device, a capability advertisement; and determining, by the first device, whether the second device supports multi-link operation based on the capability advertisement.

14. A computer program product, comprising: a non-transitory computer readable medium comprising code for configuring a processor to perform steps comprising: determining a latency sensitivity for first data for over a multi-link virtual private network between a first device and a second device, wherein determining the latency sensitivity for first data comprises determining the latency sensitivity for first data based on historical workload characteristics of the first device; determining whether the latency sensitivity over the multi-link virtual private network satisfies a criteria, wherein the criteria comprises a first threshold corresponding to a first network policy and a second threshold corresponding to a second network policy, wherein the first network policy and the second network policy correspond to different power profiles; and when the criteria is determined to be satisfied: determining a plurality of jitter likelihood values corresponding to a plurality of permutations of multi-link configurations, each of the plurality permutations comprising a plurality of wireless links between the first device and the second device, wherein the plurality of wireless links comprise a plurality of virtual private network links of the multi-link virtual private network; and configuring the multi-link virtual private network operation with a selected one of the plurality of permutations of multi-link configurations between the first device and the second device using a first link of the plurality of wireless links and a second link of the plurality of wireless links, wherein the selected one of the plurality of permutations is based on the plurality of jitter likelihood values and an associated power consumption with each of the corresponding plurality of permutations of multi-link configurations.

15. The computer program product of claim 14, wherein determining the latency sensitivity for first data comprises determining the latency sensitivity for first data based on historical workload characteristics of the first device.

16. The computer program product of claim 14, wherein determining the plurality of jitter likelihood values corresponding to the plurality of links is based on historical data comprising workload priority, corresponding to the plurality of the links and current states of the plurality of the links.

17. The computer program product of claim 14, wherein the processor is further configured to perform operations comprising: receiving, by the first device from the second device, a capability advertisement; and determining, by the first device, whether the second device supports multi-link operation based on the capability advertisement.

18. The computer program product of claim 14, wherein the medium further comprises code for configuring a processor to perform operations comprising: replicating the first data as a first set of packets comprising the first data and a second set of packets comprising the second data; transmitting the first set of packets on the first link in the multi-link operation; and transmitting the second set of packets on the second link in the multi-link operation.

19. The computer program product of claim 14, wherein the medium further comprises code for configuring a processor to perform operations comprising: configuring multi-link operation comprises configuring a first physical radio for operation on a first frequency band for transmitting the first set of packets on the first link in the multi-link operation; and configuring multi-link operation comprises configuring a second physical radio for operation on a second frequency band for transmitting the second set of packets on the second link in the multi-link operation.

* * * * *